United States Patent [19]
Mehrbrodt

[11] 3,905,458
[45] Sept. 16, 1975

[54] ELECTRO-MAGNETICALLY ACTUATED SPRING CLUTCH

[75] Inventor: Alphonso W. Mehrbrodt, Brecksville, Ohio

[73] Assignee: Marquette Metal Products Company, Cleveland, Ohio

[22] Filed: June 26, 1974

[21] Appl. No.: 483,130

[52] U.S. Cl.................. 192/26; 192/35; 192/84 R
[51] Int. Cl.... F16d 11/06; F16d 13/02; F16d 37/02
[58] Field of Search....... 192/26, 35, 36, 84 R, 84 B

[56] References Cited
UNITED STATES PATENTS

| | | | |
|---|---|---|---|
| 2,829,748 | 4/1958 | Sacchini et al. | 192/26 |
| 3,177,995 | 4/1965 | Mason | 192/35 |
| 3,393,779 | 7/1968 | Sacchini | 192/26 |
| 3,394,785 | 7/1968 | Crutcher | 192/26 X |
| 3,465,857 | 9/1969 | Baer | 192/36 |
| 3,521,730 | 7/1970 | Weatherby | 192/26 X |
| 3,570,639 | 3/1971 | Fredell et al. | 192/26 X |

*Primary Examiner*—Samuel Scott
*Assistant Examiner*—Lance W. Chandler
*Attorney, Agent, or Firm*—Arthur Frederick; Victor D. Behn

[57] ABSTRACT

The electro-magnetically actuated spring clutch has coaxially arranged input and output drums, coil spring, control sleeve and a field coil of an electromagnetic device disposed and supported within a stationary housing. The coil spring is in engagement with the input and output drums to transmit rotation from the input drum to the output drum. The coil spring is also connected at one end portion to the control sleeve to cause, when the latter is held against rotation, the expansion of the coils of the coil spring and thereby interruption of transmission of rotation from the input drum to the output drum. An armature of washer-like configuration is spline connected to the housing to be fixed against rotation but capable of axial movement toward and away from the field coil and control sleeve. Biasing means is provided to urge the armature in a direction away from the field coil and control sleeve, this biasing force being overcome by the magnetic force generated upon energization of the field coil. The armature and control sleeve have stop members which alternately engage and disengage upon energization and de-energization of the electromagnetic device and the consequent axial movement of the armature to thereby effect engagement and disengagement of the control sleeve and transmission or cessation of rotation from the input drum to the output drum.

10 Claims, 4 Drawing Figures

ELECTRO-MAGNETICALLY ACTUATED SPRING CLUTCH

The invention relates to spring clutches and, more specifically, spring clutches having electro-magnetic means for effecting actuation of the spring clutch.

BACKGROUND

Heretofore, electro-magnetically actuated spring clutches, such as exemplified in the U.S. Pat. Nos. to Parker, No. 2,976,976; Sajovec, Jr., No. 3,185,276; Baer, No. 3,349,880; Baer No., 3,637,056; and Ford, No. 3,684,068, in an effort to achieve compactness have employed a control member, collar or sleeve which has an integral radially extending flange portion upon which an electro-magnetic device, when energized, acts to axially move the entire control member and thereby actuation of a coil spring to effect transmission of rotation or interrupt transmission of rotation. This requires a relatively large magnetic force to cause the relatively large mass of the control member to move and a relatively large bearing surface to support the control member for such movement without binding. In addition, the magnetic flux leakage into and through the control sleeve adversely affects the magnetic circuit. Also, when the control member is free to rotate, a relatively large mass is rotated. Furthermore, to change the clutch assembly from a normally engaged to a normally disengaged clutch and vice versa, independent of energization or de-energization of the electro-magnetic device requires a complete reconstruction of the clutch assembly. This increases fabrication costs and inventory supplies which further adds to the expense of the clutch assemblies. Another disadvantage of known electro-magnetic spring clutches of the type disclosed in the aforementioned patents is that an over-travel detent or positive stop feature, such as disclosed in the patent to Baer, U.S. Pat. No. 3,373,851, cannot be employed in the assembly because the reaction torque is transmitted through the frictionally engaged sleeve. The present invention, however, permits the incorporation of an over-travel detent or positive stop feature because the full driving or braking torque reaction is transmitted, via the armature and clutch housing, to a stationary support.

Accordingly, it is an object of this invention to provide an electro-magnetically actuated spring clutch in which axial movement of the control member in response to energization or de-energization of the electro-magnetic device is obviated.

It is another object of the present invention to provide an electro-magnetically actuated spring clutch which is capable of performing as a normally engaged or normally disengaged clutch assembly without the need for different or additional components.

It is a further object of this invention to provide an electro-magnetically actuated spring clutch in which the electro-magnetic device requires less energy to effect actuation of the control member.

A still further object of the present invention is to provide an electro-magnetically actuated clutch in which the control member mass is relatively small and thereby increases the efficiency of the assembly by reducing the amount of load attributable to the mass of the control member when it is free to rotate.

SUMMARY

It is, therefore, contemplated by the present invention to provide an electro-magnetically actuated spring clutch which is compact in relation to its torque load capacity. The spring clutch comprises a stationary housing in which is supported for rotation coaxially arranged input and output hubs or drums. A coil spring is disposed to surround said input and output drums. A control member or sleeve is arranged to surround the coil spring. One end portion of the spring is connected to the control sleeve either by a radially extending tang portion or via an interference fit between one or more coils of the spring and the control sleeve so that, in relation to the direction of wind ("hand") of the coil and the direction of rotation of the input drum, the coils of the spring are caused to contract and grip the input and output drums and thereby transmit rotation from the input drum to the output drum. An electro-magnetic means is disposed within the housing in close, spaced relationship with and surrounding the control sleeve. A ring-shaped armature is supported against rotation by the housing adjacent the electro-magnetic means and yet free to move axially relative to the housing, such as by spline means, so as to be capable of slidable movement toward the electro-magnetic means and the control sleeve upon energization of the latter. A biasing means, as for example a plurality of springs, are provided for urging the armature away from the electro-magnetic means when the latter is de-energized. The control sleeve and armature have means coacting together to effect engagement of the control sleeve and said armature to prevent rotation of the control sleeve in one of the operative positions of the armature.

In another aspect of this invention the armature and control sleeve engaging means comprises an abutment means on said armature and an abutment means at opposite end portions of the control sleeve. The control sleeve abutment means are so disposed at opposite ends thereof that end-to-end reversal of the control sleeve relative to the armature changes the spring clutch from a normally disengaged clutch to a normally engaged clutch or vice versa without any additional or modified clutch assembly components.

BRIEF DESCRIPTION OF THE DRAWINGS

The invention will be more fully understood from the following detailed description thereof when considered in connection with the accompanying drawing wherein one embodiment of the invention is illustrated by way of example, and in which.

DESCRIPTION OF THE PREFERRED EMBODIMENT

Figure 2:
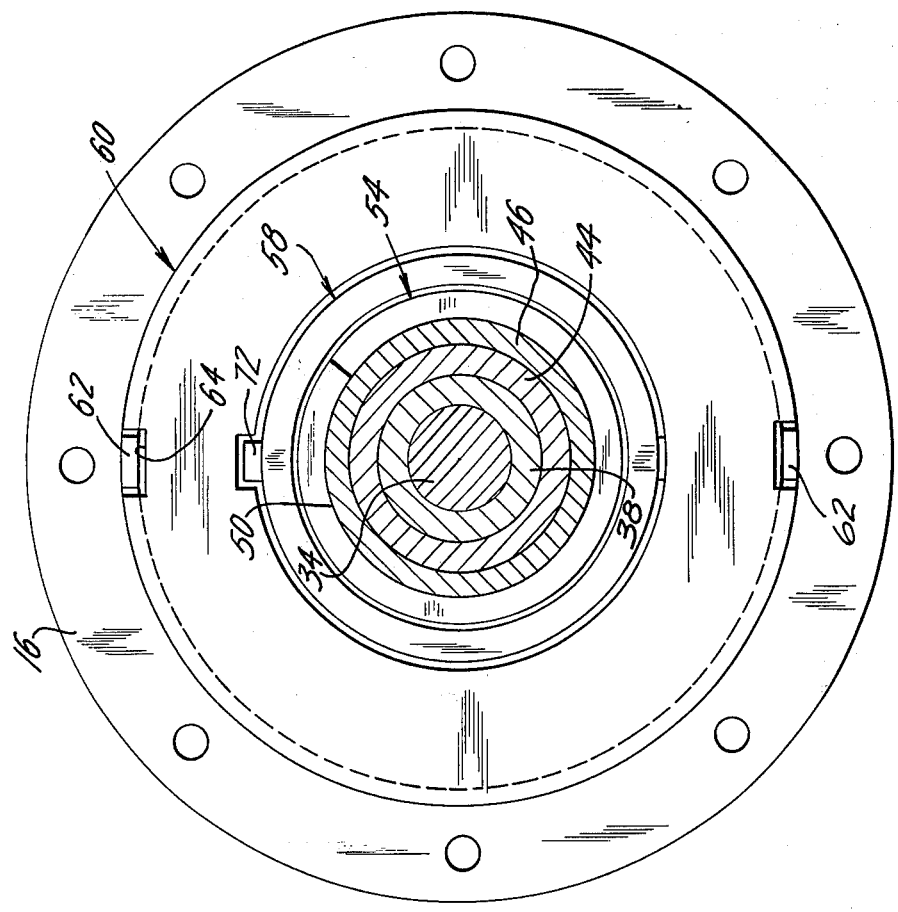
FIGS. 2 and 3 are transverse cross-sectional views, respectively, taken substantially along lines 2—2 and 3—3 of FIG. 1, FIG. 3 being on a smaller scale.
Figure 1:
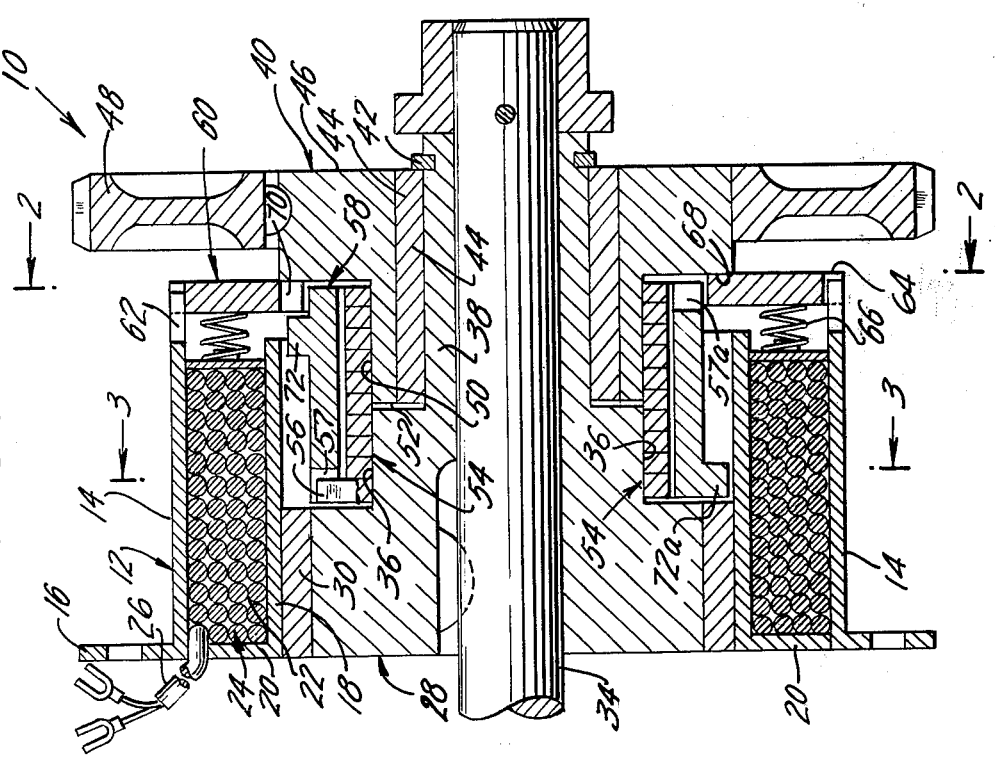
FIG. 1 is a longitudinal cross-sectional view of the electro-magnetically actuated spring clutch according to this invention.

Now referring to the drawings and more specifically to FIGS. 1 and 2, the reference number 10 generally designates the electro-magnetically actuated spring clutch according to this invention. While spring clutch 10 is shown and will be described as being a normally engaged spring clutch, it is to be understood that spring clutch 10 may be a normally disengaged spring clutch without departure from the scope and spirit of this invention. In fact, as hereinafter more fully described, the spring clutch 10 can be assembled as a normally engaged or normally disengaged clutch without the use of modified or additional components.

The spring clutch 10 comprises a housing 12, which consists of a generally cylindrical shell or outer wall 14 and having at one end a radially extending mounting flange 16. The flange 16 serves to permit the housing to be secured to a stationary support structure, not shown. The housing 12 also includes a spaced inner shell or wall 18 which is connected at one end by a radial wall 20 interconnecting walls 14 and 18. The outer wall 14, inner wall 18 and radial wall 20 define therebetween an annular space for receiving a field coil or winding 22 of an electro-magnetic device 24. The field winding 22 is suitably connected to a source of electrical current (not shown) by way of an electrical conduit 26.

An input hub or drum 28 is supported for rotation in housing 10 by a bearing 30 which may, as shown, be of the sleeve type or may be of other suitable type, such as a roller or ball bearing. The input drum 28 has a bore within which is keyed or otherwise suitably secured a driveshaft 34. The driveshaft 34 is connected to a rotary power mechanism (not shown), such as an electrical or fluid motor, to effect rotation of the driveshaft. The input drum 28 has a first reduced diameter portion to provide an annular clutching face 36 and a further reduced diameter neck portion 38.

An output hub or drum 40 is mounted on neck portion 38 of input drum 28 and is secured against axial movement in a direction to the right as viewed in FIG. 1. A sleeve bearing 44 or other suitable type bearing is interposed between neck portion 38 and output drum 40. The output drum 40 has a main body portion 46 to which is keyed or otherwise secured an output gear 48 or other suitable output member such as a pulley or sprocket. A reduced diameter end portion integral with main body portion 46 is provided to form an annular clutching face 50. The output drum 40 is dimensioned so that the reduced diameter end portion is slightly spaced from the end of the first reduced diameter portion of input drum 28 to form a crossover gap 52. The reduced diameter end portion of output drum 40 is also dimensioned in diameter such that the clutching face 50 is substantially co-planar with clutching face 36 of input drum 28. To transmit rotation from input drum 28 to output drum 40, a clutch spring 54 is provided.

The clutch spring 54 is provided with a plurality of helical coils and may be of any suitable spring steel material and cross-sectional shape. The clutch spring 54 is dimensioned so as to extend across crossover gap 52 and to surround clutching faces 36 and 50. The end portion of clutch spring 54 is deformed to provide a radially extending tang 56. The direction of the helix or "hand" of clutch spring 54 is such that rotation of input drum 28 has, through frictional engagement or interference fit with clutching surfaces 36, the effect of contracting the coils of clutch spring 54 so that the clutch spring tightly grips clutching surfaces 36 and 50 and thereby transmits rotation from input drum 28 to output drum 40. The tang 56 of clutch spring 54 is receivable in a slot or opening 57 of a control member of sleeve 58 so that the control sleeve is rotatively carried by the rotation of clutch spring 54 and the input and output drums. The control sleeve 58 cooperates with the energization of field winding 22 and actuation of an armature 60 to cause clutch spring 54 to release its grip on, at least, clutching face 36 and thereby interrupt or stop transmission of rotation to the output drum 40.

The armature 60 is made of magnetic material and is of flat washer-like configuration. The armature 60 is supported by spline means within housing 12 adjacent to field winding 22 for reciprocative axial movement relative to the housing and toward and away from field winding 22. The spline means may, as shown, comprise two diametral tabs or lugs 62 axially extending from outer wall 14 of housing 12 and projecting into diametral slots 64 in the outer periphery of armature 60. Obviously, without departure from the scope and spirit of this invention, more than two pairs of lug and slot interconnections may be provided. Biasing means which may comprise, as is shown, a plurality of springs 66 are disposed between field winding 22 and armature 60 to urge the latter away from the field winding. The shoulder 68, formed by reduced diameter portion of output drum 40 serves to limit, under the urging of springs 66, the extent of armature 60 movement. To arrest rotation of control sleeve 58 upon energization of field winding 22 and axial movement of armature 60 in a direction toward the latter against the force of springs 66, armature 60 is provided with an abutment means in the form of a slot 70 in the inner periphery thereof which is adapted to engage an abutment means in the form of a lug or detent 72 radially extending from the outer peripheral surface of control sleeve 58. Obviously, more than one slot 70 or detent 72 may be provided so that the maximum amount of time for engagement is reduced.

In the operation of spring clutch 10 herein described, rotation from a prime mover (not shown) transmitted to driveshaft 34 effects rotation of input drum 28. The rotation of input drum 28 is transmitted, via spring clutch 54, to output drum 40 and from the latter, by way of gear 48, to a load (not shown). Upon energization of electro-magnetic device 24 and the passage of electrical current through field winding 22, armature 60 is axially moved against the force of springs 66 to the left as viewed in FIG. 1 under the magnetic force field generated by the field winding. When lug 72 of control sleeve 58 is rotatively carried into registry with slot 70 of armature 60, lug 72 enters slot 70 and rotation of control sleeve 58 is thereby arrested. Cessation of rotation of control sleeve 58 holds one end of clutch spring 54 against rotation by reason of the tang 56 and slot 57 interconnection between control sleeve 58 and clutch spring. With the continued rotation of input drum 28 while one end of clutch spring 54 is held stationary, the coils of spring 54 are caused to expand and release their grip on clutching face 36 and thereby effects interruption of transmission of rotation. Transmission of rotation from input drum 28 to output drum 40 is restored by de-energizing field winding 22 which then releases the armature for axial movement under the urging of springs 66 and, in turn, releases control sleeve 58 for rotation with spring 54.

Figure 4:
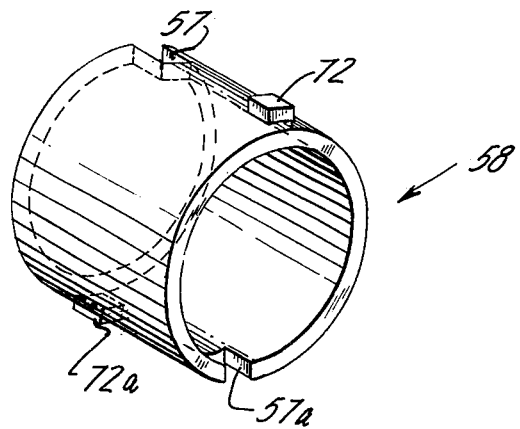
FIG. 4 is a perspective view of the control member employed in the spring clutch according to this invention.
Figure 3:
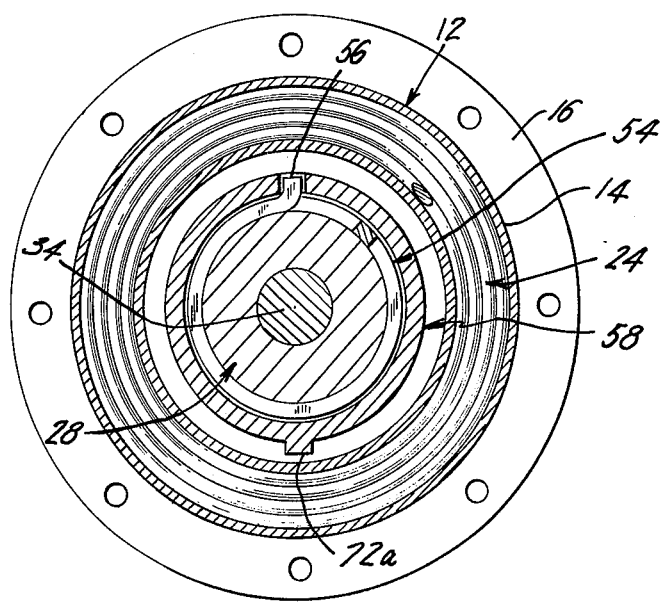

As best shown in FIG. 4, control sleeve 58, in accordance with this invention, in addition to lug 72 disposed adjacent one end thereof has a second lug 72a which is disposed at the opposite end of the control sleeve. The lug 72a is disposed closer to the adjacent end of the control sleeve than is lug 72 to its adjacent end of the control sleeve so that when the position of control sleeve 58 is reversed end-to-end, lug 72a is positioned in slot 70 of armature 60. Also, a second slot 57a, corresponding to slot 57, is provided in the control sleeve so that, in the reversed end-to-end position, tang 56 of clutch spring 54 engages control sleeve 58. In this end-to-end reversed position spring clutch 10 is converted from a normally engaged to a normally disengaged clutch where energization of field winding 22 is required to effect transmission of rotation from the input drum 28 to output drum 40.

It is believed now readily apparent that an electro-magnetically actuated spring clutch has been disclosed which is compact in size and increases efficiency by reducing inertia loads. It is a spring clutch in which, in the assembly thereof, the spring clutch may be made into a normally engaged clutch or a normally disengaged spring clutch and vice versa without new or modified component parts. In addition, it is an electro-magnetically actuated spring clutch which may be provided with an over-travel detent or a positive stop feature since the reaction torque is positively transmitted to the clutch housing and its support.

What is claimed is:

1. An electro-magnetically actuated spring clutch comprising:
   a. a stationary housing;
   b. an input drum mounted for rotation in said housing;
   c. an output drum disposed in said housing and supported for rotation adjacent and coaxial to the input drum;
   d. a coil spring disposed to surround said input and output drums;
   e. a control member arranged to surround said coil spring and in engagement with the coil spring to effect, in one operative position, contraction of the coil spring to grip the input and output drums and thereby transmission of rotation from the input to the output drums and in another operative position, expansion of the coil spring to interrupt such rotary transmission;
   f. an electro-magnetic means disposed within said housing in close spaced coaxial relationship with and surrounding said control member;
   g. a ring-shaped armature supported against rotation by the housing adjacent said electro-magnetic means and free to move axially relative to the housing so as to be capable of slidable movement toward and away from said control sleeve and electro-magnetic means upon energization and de-energization of said electro-magnetic means;
   h. said control member and armature having means coacting together to effect engagement of the control member and said armature to prevent rotation of the control member in one of said operative positions of the armature; and
   i. biasing means for urging the armature in a direction away from said electro-magnetic means when the latter is de-energized.

2. The apparatus of claim 1 wherein said coacting means of said control member and armature comprises a means forming a first abutment on said control sleeve and a complementary second abutment on said armature which in one operative position of said armature contact each other to prevent rotation of the control member.

3. The apparatus of claim 2 wherein said first abutment is located at one end portion of the control sleeve and said control is a sleeve and has a third abutment disposed at the opposite end portion thereof so that end-to-end reversal of the control sleeve relative to the armature permits the spring clutch to alternately function either as normally engaged spring clutch or a normally disengaged spring clutch.

4. The apparatus of claim 3 wherein said first abutment and third abutments are radially extending lugs and the second abutment is a slot in the armature dimensioned to receive said lugs.

5. The apparatus of claim 2 wherein said first abutment is located at one end portion of the control member and said control member has a third abutment disposed at the opposite end portion thereof so that end-to-end reversal of the control member relative to the armature provides alternately either abutment of said first and second abutments when the electro-magnetic means is energized or disengagement of said second and third abutments when the electro-magnetic means is energized.

6. The apparatus of claim 1 wherein said coil spring has a tang end portion and said control member has an opening therein to receive said tang end portion to thereby effect engagement of the coil spring and control member.

7. The apparatus of claim 1 wherein said electro-magnetic means comprises a field coil and electrical connecting means for connecting said field coil to a source of electrical current.

8. The apparatus of claim 1 wherein said armature is of flat washer-like, configuration which is spline connected at the periphery thereof to the housing.

9. The apparatus of claim 8 wherein said coacting means of said control member and armature comprises a radially extending lug on said control member and a slot in the inner periphery of the armature for receiving said lug.

10. The apparatus of claim 1 wherein said input and output drums have peripheral surfaces coextensive with each other with a crossover gap therebetween which is spanned by the coil spring.

* * * * *